United States Patent [19]

Palm

[11] Patent Number: 4,702,035

[45] Date of Patent: Oct. 27, 1987

[54] LINE STORAGE CONTAINER

[76] Inventor: George R. Palm, Rte. #1, Baudette, Minn. 56623

[21] Appl. No.: 9,821

[22] Filed: Feb. 2, 1987

[51] Int. Cl.⁴ ............................................. A01K 97/06
[52] U.S. Cl. ..................................... 43/57.1; 242/96; 339/119 C
[58] Field of Search ................. 43/57.1, 54.1; 242/96, 242/85.1; 339/119 C

[56] References Cited

U.S. PATENT DOCUMENTS

| | | | |
|---|---|---|---|
| D. 263,505 | 3/1982 | Black | 242/96 |
| 3,991,507 | 11/1976 | Bart | 43/54.1 |
| 4,061,290 | 12/1977 | Harrill | 242/96 |
| 4,200,249 | 4/1980 | Synstelien | 43/57.1 |
| 4,653,833 | 3/1987 | Czubernat | 339/119 C |

FOREIGN PATENT DOCUMENTS

| | | | |
|---|---|---|---|
| 155653 | 8/1956 | Sweden | 43/57.1 |
| 8482 | 4/1895 | United Kingdom | 43/57.1 |

Primary Examiner—Gene P. Crosby
Attorney, Agent, or Firm—Gregory P. Kaihoi; James R. Haller

[57] ABSTRACT

A storage container for flexible lines having a bulky member on one end. The container has a cylinder with first and second flanges to form a spool. The spool has a discontinuity in the cylinder and in one of the flanges, so that the bulky member can be stored within the cylinder with the line extending through the discontinuity and wound about the spool. A cover is receivable over one flange and cooperates with a wall of the other flange to enclose the items to be stored.

20 Claims, 7 Drawing Figures

LINE STORAGE CONTAINER

TECHNICAL FIELD

This invention relates to a storage container for flexible, elongated lines, and particularly those having a bulky object on one end thereof, such as fishing lines, electrical extension cords, automobile jumper cables, and so forth.

BACKGROUND ART

Storage of elongated, flexible lines such as fishing lures with leaders, electrical extension cords, automobile jumper cables, tow ropes, and so forth, have created problems prompting a variety of proposed solutions which have met with mixed success.

Spools of various types have been used to store lines in certain applications, but unique storage problems arise when one or both ends of the line contains a bulky object such as a fish hook, leader swivel, jumper cable clamp, etc. In some spool-type containers, these bulky ends are merely left to dangle outside the container, such as is shown in U.S. Pat. No. 3,062,475, Miller (Flexible Container for Leaders and the Like). In other devices, the bulky end is hooked in an aperture on the outer portion of the device, such as in U.S. Pat. No. 4,200,249, Synstelien, et al. (Storage Device), and U.S. Pat. No. D. 273,410, Tomosy (Combined Fish Hook and Line Dispenser and Storage Container). Similarly, U.S. Pat. No. 2,743,546, Crist (Leader-Keepers) shows a rectangular-shaped spongelike device where the leader hook is embedded in the sponge material.

U.S. Pat. No. 3,991,507, Bart (Collapsible Organizer Receptacle for Fishing Leader) shows a generally cylindrical, accordion-like device which includes apertures in the accordion folds into which a fish hook may be lodged, allowing the line to be wrapped around the accordion fold crease. Each crease may hold a separate leader/hook, and the device may then be collapsed and placed in shell which retains the accordion in the compressed state.

The above devices all are somewhat complicated from a manufacturing standpoint and/or in actual use. Also, devices which have the fish hook on the outside, such as Synstelein and Miller, are vulnerable to tangling problems and may not adequately shield the hook. Furthermore, none of these devices provide for protected storage of bulky lures (as opposed to single, generally flat fish hooks).

BEST MODE FOR CARRYING OUT THE INVENTION

A storage container according to the invention may be manufactured in a variety of sizes to, accommodate a variety of physical objects. Two preferred applications are described below, namely, storage of fishing lines and jumper cables. It will be understood, however, that the invention may be adapted to other suitable applications such as tow ropes, electric extension cords, and so forth, by enlarging or reducing the size of the container appropriately.

Figure 1:
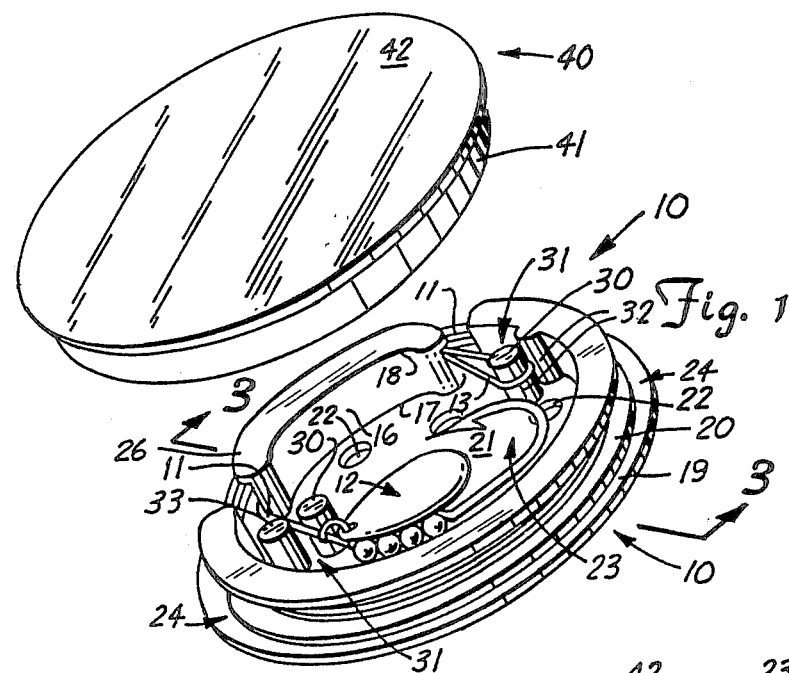
FIG. 1 is a perspective view of a device of the invention.
Figure 3:
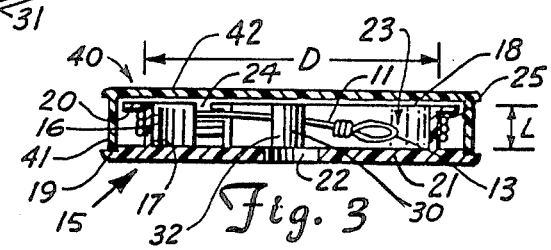
FIG. 3 is a cross-sectional view of FIG. 1 taken alone line 3—3 thereof.
Figure 2:
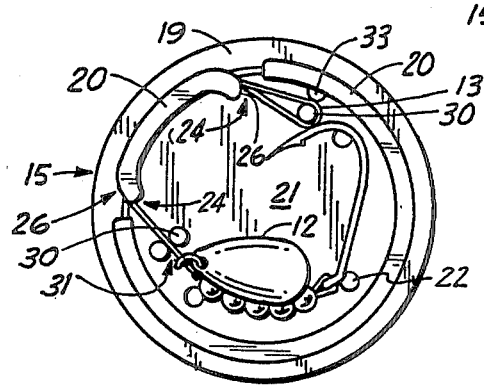
FIG. 2 is a plan view of a device of the invention.

Referring to FIGS. 1-3, a preferred container adapted for storage of fishing lures is depicted. In this application, the container is particularly suited to storage of jigs and other bulky lures which typically include one or more hooks with associated structure such as spinners, stops, sinkers, bobbers, and so forth. Often, the components of the lure are permanently tied to a leader which may be anywhere from a few inches to several feet long. The leader may be standard monofilament fishing line, nylon, teflon, or even steel.

A preferred container suitable for storage of such fishing lures includes a spool (15) comprised of a cylinder (16) of relatively short length measured from its first end (17) to its second end (18). The cylinder includes first and second flanges (19) and (20) respectively, carried by the first and second ends (17) and (18) respectively, of the cylinder (16). The flanges extend radially outwardly of the cylinder (16) and define an annular channel (34) for receiving the line (11). The cylinder (16) and second flange (20) include at least one discontinuity (24) to allow the line (11) to pass radially inwardly from the annular channel (34) into a storage cavity (23). The cavity (23) is defined by the cylinder (16) and a wall (21), which extends substantially across the first end (17) of the cylinder (16). The discontinuity (24) in the cylinder (16) need not extend the entire length of th cylinder (16) (the length being defined with reference to a longitudinal axis of the cylinder (16)). The discontinuity (24) should extend for at least a portion of the combined length (L) of the cylinder (16) and second flange (20) however, to permit passage of the line (11) into the storage cavity (23).

The outer surface (25) of the cylinder (16) may include a radially inwardly tapered portion (26) adjacent one or both sides of the discontinuity (24), providing relief for that portion of the line (11) entering the storage cavity (23), thereby preventing unnecessary stress and/or kinking of the line (11).

Preferably the spool (15) includes means defining a slot (31) located radially inwardly of the cylinder (16) proximate the discontinuity (24) for securing the line (11) within the storage cavity (23). Desirably, the slot means (31) is defined by two opposed convex surfaces (32). Such surfaces avoid sharp corners and reduce the likelihood of damage (such as abrasion and kinking) to the line (11). The width of the slot (31) should be larger, but not substantially larger, than the diameter of the line (11). For lines (11) that are particularly stiff (e.g., steel leaders and jumper cables), the slot (31) may be somewhat wider without losing its effectiveness.

In a preferred embodiment, the convex surface is defined by a post (30) extending from the wall (21) generally parallel to the cylinder (16). Desirably, the post (30) is approximately the same length as the length (L) of the cylinder (16), thereby preventing the line (11) from slipping out of the slot (31). The slot may be defined by one such post (30) and the cylinder (16) itself, or by a post (30) and a second partial post or convex surface (33) extending radially inwardly of the cylinder (16), as shown in FIGS. 1 and 2. Alternately, the slot (31) may be defined by two or more such posts (30).

Although not strictly necessary in some applications of the invention, desirably a cover (40) is also provided to assist in retaining the bulky member (12) within the storage cavity (23), and further to protect the line (11) wrapped about the spool (15). Desirably the cover includes a second cylinder (41) having a length substantially equivalent to or slightly larger than the length (L) of the spool cylinder (16), the cover cylinder (41) having an internal diameter approximately equal to the outside diameter of one of the flanges (19) and (20) of the spool (15). When used with a cover (40), perforations in either the cover (40) or the wall (21) of the spool (15) may be provided to facilitate ventilation of the container. Ventilation may be desirable when fishing lures are stored, thereby allowing the lure to dry out between uses.

Desirably the length (L) of the cylinder (16) is substantially less than the diameter (D) of the cylinder (16); preferably the diameter (D) of the cylinder is at least about three times the length (L) of the cylinder (16).

In use, referring to FIG. 1, a fishing lure or similar bulky member (12) may be placed in the storage cavity (23) of the container (10). The line (11) is passed through the slot (31), through the discontinuity (24), and then is wrapped about the outer surface (25) of the cylinder (16). The other end of the line (11) then is strung through a discontinuity (24) and a slot (31) into the storage cavity (23), thereby securing the line and lure within the container (10).

Although the embodiment depicted in FIGS. 1-3 includes two discontinuities (24), a single discontinuity (24) with a pair of slot means (31) would also suffice. Desirably the slot means (31) is positioned proximate the discontinuity (24) in a position which will tend to avoid excessive stress, bending or kinking of the line (11). Preferably the slot (31) is located along an arc generally tangent to the outer surface (25) of the cylinder (16), the arc having a radius less than the radius of the outer surface (25) of the cylinder (16) and coinciding generally with the arc of the line (11) as it passes through the discontinuity (24).

Figure 4:
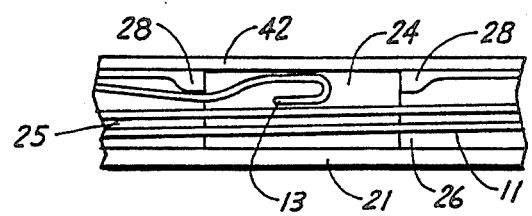
FIG. 4 is a side-partially broken away view of a modified of the invention.

In certain applications it may be desirable to provide shoulders (28) adjacent the discontinuity (24) in the cylinder (16) and second flange (20) to prevent windings of the line (11) from entirely occluding the discontinuity (24), thereby assuring low stress entry of the end (13) of the line (11) through the discontinuity (24) into the storage cavity. This feature may be particularly useful in embodiments designed for storage of lines which are relatively long and thick, such as jumper cables. It is also desirable if the cover wall (42) abuts the second flange (20) of the spool (15), as shown in FIG. 4, and if the second flange (20) is of relatively small thickness; the shoulders assure proper seating of the cover (40) without compressing the windings of the line (11).

Figure 5:
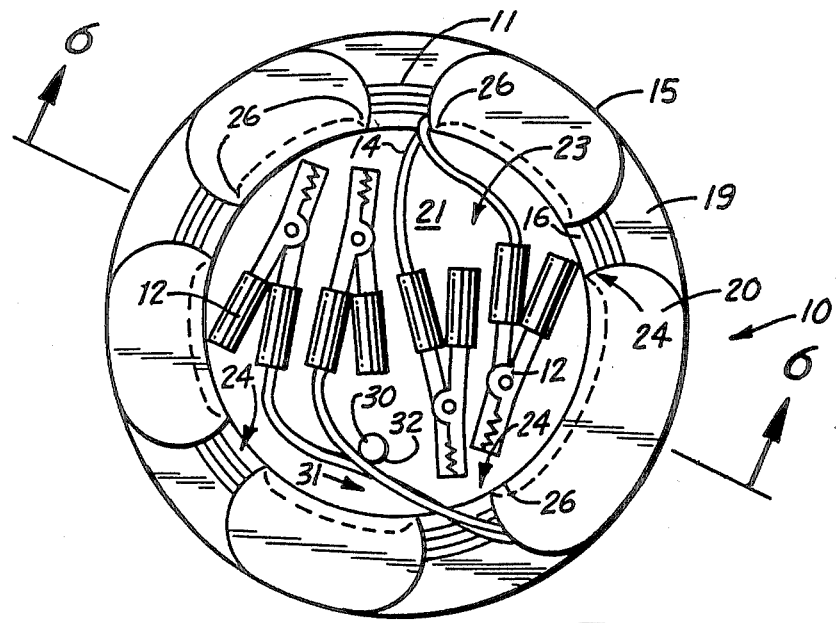
FIG. 5 is a plan view of an alternative embodiment of the invention.
Figure 6:
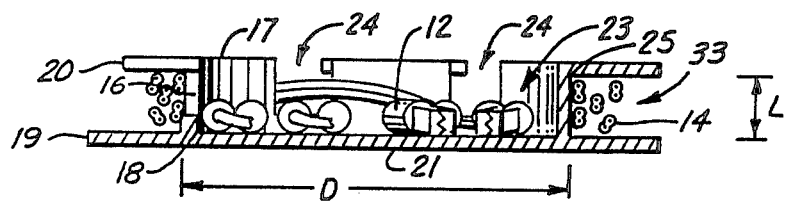
FIG. 6 is a cross sectional view of FIG. 5 taken along line 6—6 thereof.

FIGS. 5 and 6 depict another application of the container of the invention, namely storage of automotive jumper cables. The structure of the device may be substantially similar to that previously described, except on a somewhat larger scale, e.g., an over-all diameter in a range of 12-24 inches. Because jumper cables (14) tend to be relatively thick and somewhat stiff, particularly in very cold weather, the slot means (31) may be substantially larger or omitted entirely, the bulk of the jumper cable clamps and the resilient stiffness of the cables (14) serving to retain the ends of the cables (14) within the storage cavity (23). Multiple discontinuities (24) may be provided, as shown in FIGS. 5 and 6, to reduce the average amount of cable stored within the storage cavity (23) for any given length jumper cables. The cover (40) generally is not necessary in this application.

Figure 7:
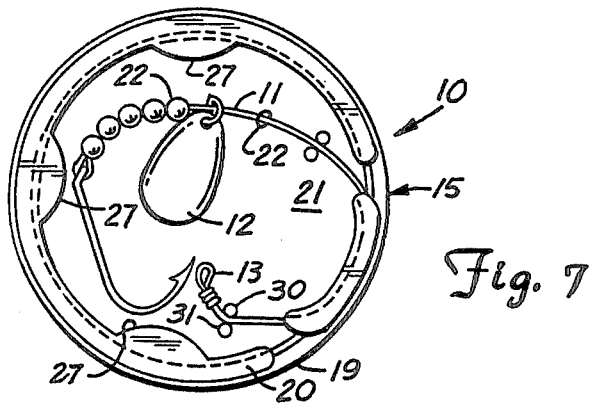
FIG. 7 is a plan view of an alternate embodiment of the invention.

In various applications of the present invention it may be desirable to further include flange portions (27) extending generally radially inwardly from the second end (18) of the cylinder (16) to assist in retaining the line (11) and bulky member (12) within the storage cavity (23). See FIG. 7. This feature may be particularly useful for lines which are somewhat resilient, i.e., they tend to resist curvature and therefore resist retention in the storage cavity, particularly if a length of line approaching the circumference of the cylinder (16) must be stored within the cavity (23). Where more discontinuities (24) are provided in the cylinder (16), however, generally less line (11) will have to be stored within the cavity (23).

While a preferred embodiment of the present invention has been described, it should be understood that various changes, adaptations and modifications may be made therein without departing from the spirit of the invention and the scope of the appended claims.

What is claimed is:

1. A storage container for a flexible, elongated line having a bulky member on one end thereof, comprising a spool having: a first cylinder of relatively short length with first and second ends; first and second flanges extending radially outwardly from the first and second cylinder ends respectively; and wall means extending substantially across said first cylinder end, defining with the cylinder a storage cavity; a portion of the cylinder and the second flange having a discontinuity whereby the bulky member may be stored within said cavity with the line passing through the discontinuity and wound about the spool.

2. The container of claim 1 wherein the cylinder has an outer surface against which the line is wound, said outer surface tapering radially inwardly adjacent at least one side of the discontinuity.

3. The container of claim 1 including two such discontinuities.

4. The container of claim 1 including means defining a slot located radially inwardly of the cylinder proximate the discontinuity for securing the line within the storage cavity.

5. The container of claim 4 wherein the slot means is partially defined by a convex surface.

6. The container of claim 4 wherein the slot means is defined by two opposed convex surfaces.

7. The container of claim 5 wherein the convex surface is defined by a post extending from the wall means generally parallel to the cylinder, said post being approximately the same length as the length of the cylinder.

8. The container of claim 7 wherein the slot means is defined by two such posts.

9. The container of claim 4 including two such discontinuities and two such slot means, one slot means being associated with each discontinuity.

10. The container of claim 1 wherein the wall is immediately adjacent and parallel to the first flange.

11. The container of claim 1 wherein the wall has perforations therethrough to provide ventilation.

12. The container of claim 1 wherein the length of the cylinder is substantially less than the diameter of the cylinder.

13. The storage container of claim 1 wherein the diameter of the cylinder is at least about three times the length of the cylinder.

14. The container of claim 1 including cover means closely receivable on the spool for retaining the line and bulky member within the container.

15. The container of claim 14 wherein the cover means comprises a second cylinder having a length substantially equivalent to the length of the first cylinder, said second cylinder having an internal diameter approximately equal to the outside diameter of one of the flanges.

16. The container of claim 15 wherein the cover means further includes a cover wall extending substantially across one edge of the second cylinder, said wall, when said cover means is assembled with the spool, being substantially parallel to said spool wall and defining with the spool wall and the first cylinder the storage cavity for the bulky member.

17. The container of claim 1 further including flange portions extending generally radially inwardly from the second end of the cylinder to assist in retaining the line and bulky member within the storage cavity.

18. The container of claim 1 further including shoulder means located adjacent one side of the discontinuity to prevent the line wound about the spool from occluding the discontinuity.

19. A storage container for a flexible, elongated line having a bulky member on one end thereof, comprising:
(a) a spool having a first cylinder of relatively short length with an outer surface and first and second ends, the diameter of the cylinder being at least about three times the length of the cylinder; first and second flanges extending radially outwardly from the first and second cylinder ends respectively; wall means extending substantially across said first cylinder end, defining with the cylinder a storage cavity; a portion of the cylinder and the second flange having a discontinuity whereby the bulky member may be stored within said cavity with the line passing through the discontinuity and wound about the outer surface of the cylinder, said cylinder surface tapering radially inwardly adjacent at least one side of the discontinuity; means defining a slot located radially inwardly of the cylinder proximate the discontinuity through which the line passes and is secured, said slot means being defined by two opposed convex surfaces, one of which is defined by a post extending from the wall means generally parallel to the cylinder approximately the same length as the length of the cylinder; and
(b) cover means closely receivable on the spool for retaining the line and bulky member within the container, said cover means comprising a second cylinder having a length substantially equivalent to the length of the first cylinder, said second cylinder having an internal diameter approximately equal to the outside diameter of one of the flanges.

20. A storage container for a flexible, elongated cable having bulky members on both ends thereof, comprising a spool having a first cylinder of relatively short length with an outer surface and first and second ends, the diameter of the cylinder being at least about three times the length of the cylinder; first and second flanges extending radially outwardly from the first and second cylinder ends respectively; wall means extending substantially across said first cylinder end, defining with the cylinder a storage cavity; the second flange and a portion of the cylinder having a plurality of discontinuities whereby the bulky members may be stored within said cavity with the cable passing through said discontinuities and wound about the outer surface of the cylinder, said cylinder surface tapering radially inwardly adjacent at least one side of the discontinuities; and shoulder means located adjacent one side of each of the discontinuities to prevent the cable wound about the cylinder from occluding the discontinuities.

* * * * *